UNITED STATES PATENT OFFICE.

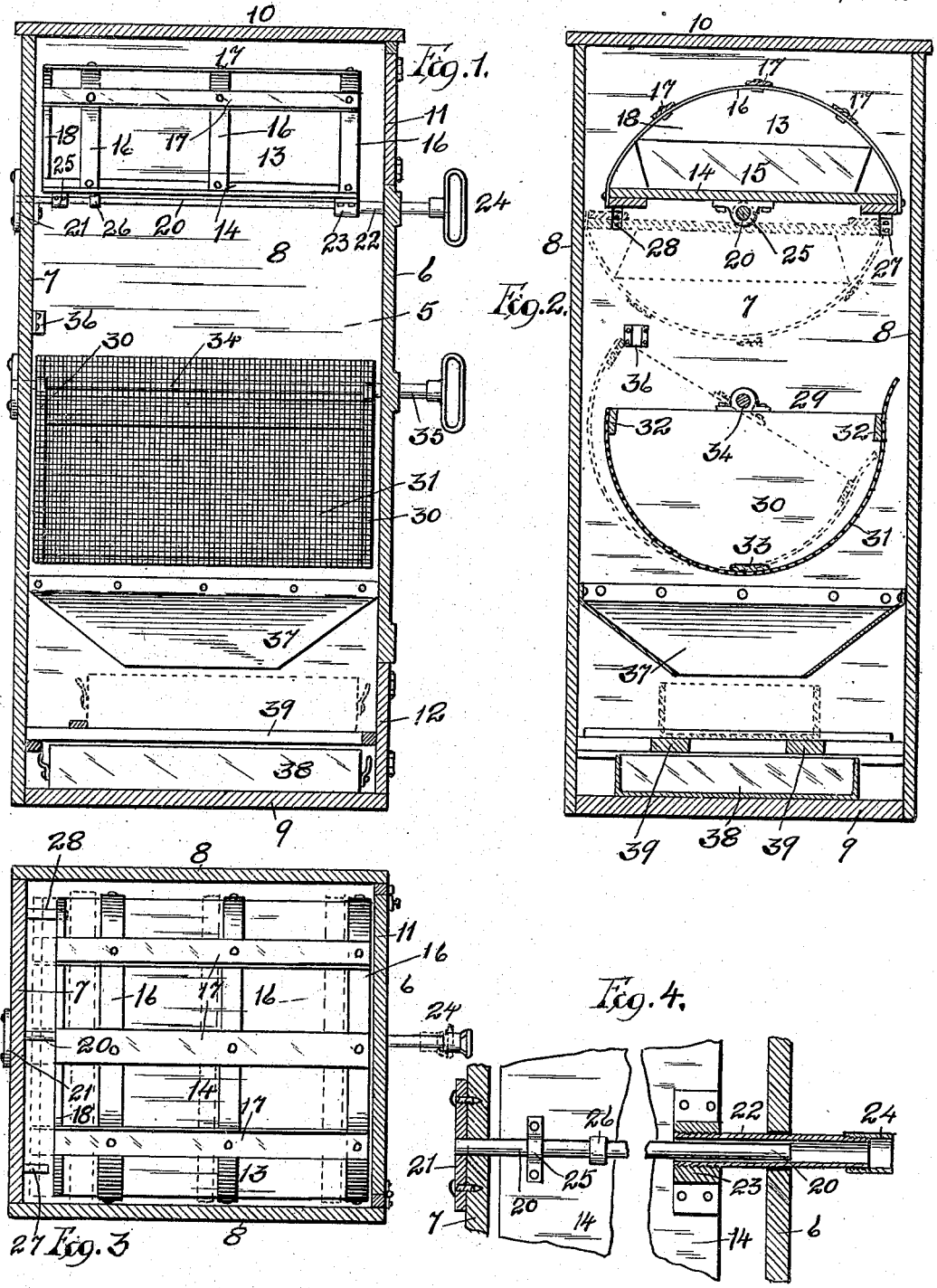

GUSTAVE LANGE, OF CHICAGO, ILLINOIS.

ASH-SIFTER.

No. 900,396. Specification of Letters Patent. Patented Oct. 6, 1908.

Application filed November 25, 1907. Serial No. 403,671.

*To all whom it may concern:*

Be it known that I, GUSTAVE LANGE, a citizen of the United States, residing at Chicago, in the county of Cook and State of Illinois, have invented certain new and useful Improvements in Ash-Sifters, of which the following is a specification.

The object of this invention is to provide an ash sifter which shall be thoroughly dust proof and at the same time easy of manipulation.

A further object of the invention is to so construct the parts that a pan of ashes can be inserted within the sifter without disturbance of the ashes and without the necessity for reaching the arm of the operator into the sifter in positioning the pan, thereby permitting the sifting operation to be performed from start to finish without danger of soiling the clothes and without inconvenience in depositing the ashes in position.

The invention consists in the features of construction and combination of parts hereinafter described and claimed.

In the drawings, Figure 1 is a sectional elevation of the outer box, showing the sifting mechanism in elevation; Fig. 2 a sectional elevation taken at right angles to Fig. 1; Fig. 3 a sectional plan view of the outer box, showing the inner mechanism in elevation; and Fig. 4 a detail, partly in section, showing the formation of the shaft upon which the cage is mounted.

The sifter, as a whole, comprises an outer box 5, of rectangular formation, comprising a front wall 6, a rear wall 7, side walls 8, a floor 9, and a roof or top 10. The front wall has located therein upper and lower hinged doors 11 and 12, respectively. In alinement with the upper door is a cage 13, comprising a solid floor 14, adapted to receive and support an ash pan 15, which floor has secured thereto three arched bars 16, which are connected at their ends with the edges of the floor and are reinforced by longitudinally extending bars 17, giving to the whole structure a cage-like formation. The cage is provided, at its rear end, with a solid end wall 18, and, at its front end the forward arch bar 16 provides an open end to permit the passage of the pan therethrough.

The cage, as a whole, is mounted upon a fixed shaft 20, which extends from rear to front of the box, the rear end being entered through the rear wall and into an outer plate 21, which holds the shaft rigidly in position at the rear end. The front end of the shaft is entered into a sleeve 22, which is free to rotate around the end of the fixed shaft and has its inner end entered into a socket 23 secured to the floor or bottom of the cage, as best shown in Fig. 4. The sleeve is provided, at its outer end, with a handle 24; and the cage is slidable upon the fixed shaft and is positioned thereon by a strap 25, which embraces the shaft, the movement of the cage being limited by a stop collar 26 secured to the shaft a slight distance forward of the strap 25. The cage is normally held in upright position by means of a pair of forwardly projecting brackets 27 and 28 secured to the rear wall 7 near the outer edges thereof and immediately below the floor of the cage. The bracket 28 projects inwardly to a greater degree than the bracket 27, and the cage is mounted upon the fixed shaft slightly off center, as shown in Fig. 2, with the result that, when the cage is pulled forward to its limit, the heavier side, which normally rests upon and is supported by the short bracket 27, will be released, causing the cage to swing down by gravity into the position indicated in dotted lines in Fig. 2, the reverse movement or swing of the cage being limited by the longer bracket 28 against which the cage will strike when thrown into reversed position.

Immediately below the cage is a rocking sifter 29, comprising semi-circular end walls 30 and a half-cylindrical screen body 31, which is connected, at its edges, to longitudinally extending rails 32, and, at its center, to a longitudinally extending rail 33. The sifter is suspended from a fixed shaft 34, which extends in parallel relation with the cage shaft 20, and the rocking sifter is adapted to be actuated by a forwardly extending handle 35, which is rigidly connected with the forward end of the rocking sifter. The sifter is adapted to be jolted by contact with a stop 36, which serves to limit the swing of the sifter in one direction, thereby more thoroughly agitating the ashes contained in the sifter than would be the case if the latter were allowed to swing free.

Immediately below the rocking sifter is a chute 37, adapted to discharge into an ash receiving pan 38, which rests upon the floor of the sifter and is adapted to be removed through the lower door 12. Immediately above the space occupied by the ash receiving pan is a pair of supporting rails 39, which extend from front to rear of the sifter box and support a pan or receptacle for the coal from which the ashes have been sifted.

In use the upper door will first be opened and a pan containing unsifted ashes will be shoved into position on the flat floor of the cage, which, when in normal position, will be on a level with the upper door, so that there will be no necessity for the operator reaching his arm into the interior of the sifter box nor disturbing the ashes in any way prior to the closing of the box. After the pan of ashes has been thus positioned, the upper handle 24 will be pulled forward, which movement releases the heavier side of the cage from its support and allows the cage containing the pan of ashes to overturn by gravity until its movement is stopped by the contact of the cage with the longer bracket 28. This movement dumps the ashes through the open portion of the cage and deposits them in the rocking sifter. The rocking sifter is then swung back and forth, by the action of the handle 35, which brings the sifter, with every oscillation, into contact with the stop 36, thereby thoroughly agitating the ashes and coal, causing the former to sift out through the screening and fall through the chute and into the pan 38 provided therefor. After the ashes have thus been completely sifted, an empty pan for the reception of the coal can be shoved in along the guide rails 39 and immediately above the pan containing the sifted ashes, after which the coals can be removed from the rocking sifter by overturning the latter until the farther edge of the sifter is swung around into contact with the stop 36, which of course will cause the coals to roll out of the sifter and fall through the chute into the pan provided for their reception.

It will be seen from the foregoing description that the various operations can be performed without any necessity for reaching into the interior of the sifter box and without the possibility of being soiled by dust or dirt generated during the sifting operation. The method of depositing the ashes in the sifter by overturning the cage is one which permits the operation to be performed by a slight pull on the handle, the cage being thereafter overturned by its own weight, and depositing the ashes in position after the box has been thoroughly closed and the dust prevented from escaping.

What I regard as new and desire to secure by Letters Patent is:

1. In an ash sifter, the combination of a sifter box, a screen sifter within the box, a rotatably mounted cage above the screen sifter and adapted to receive and hold a pan of unsifted ashes, a support for normally holding the cage in upright position, and a handle adapted to move the cage away from the support and permit its reversal, substantially as described.

2. In an ash sifter, the combination of a sifter box, a screen sifter within the box, a revoluble cage eccentrically mounted above the screen sifter and adapted, when in normal position, to receive and hold a pan of unsifted ashes, a support for the heavier side of the cage, and a handle adapted to move the cage away from the support to permit it to reverse itself by gravity and discharge the ashes into the sifter, substantially as described.

3. In an ash sifter, the combination of a sifter box, a screen sifter located within the box, a revoluble cage eccentrically mounted above the sifter and comprising a flat floor adapted to receive a pan of unsifted ashes, and an openwork top adapted to embrace and hold the pan of unsifted ashes supported upon the floor, a bracket at the rear side of the sifter box for supporting the heavier side of the cage, and a handle adapted to pull the cage forward and away from the supporting bracket for permitting its reversal, substantially as described.

4. In an ash sifter, the combination of a sifter box, a screen sifter located within the box, a revoluble cage eccentrically mounted above the sifter and comprising a flat floor adapted to receive a pan of unsifted ashes, and an openwork top adapted to embrace and hold the pan of unsifted ashes supported upon the floor, a bracket at the rear side of the sifter box for supporting the heavier side of the cage, a handle adapted to pull the cage forward and away from the supporting bracket for permitting its reversal, a receptacle below the screen sifter adapted to receive the ashes, and guideways above said receptacle adapted to receive and support a suitable receptacle for receiving coals after sifting, substantially as described.

5. In an ash sifter, the combination of a sifter box provided with upper and lower doors, a cage in alinement with the upper door and adapted to receive and hold a pan of unsifted ashes, means for reversing the cage to discharge the ashes from the pan, a rocking screen sifter pivoted below the cage, a stop for limiting the movement of the rocking screen sifter, a chute below the rocking screen sifter, and a receptacle, in alinement with the lower door, for receiving sifted ashes from the chute, substantially as described.

GUSTAVE LANGE.

Witnesses:
SAMUEL W. BANNING,
WALKER BANNING.